US008443338B2

(12) United States Patent
Cwalina et al.

(10) Patent No.: US 8,443,338 B2
(45) Date of Patent: May 14, 2013

(54) LOGICAL EXTENSIONS TO INTERMEDIATE CODE

(75) Inventors: Krzysztof J. Cwalina, Sammamish, WA (US); Michael C. Fanning, Redmond, WA (US); Brian M. Grunkemeyer, Redmond, WA (US); Brent E. Rector, Redmond, WA (US); Barend H. Venter, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1054 days.

(21) Appl. No.: 12/247,304

(22) Filed: Oct. 8, 2008

(65) Prior Publication Data
US 2010/0088669 A1    Apr. 8, 2010

(51) Int. Cl.
G06F 9/44    (2006.01)

(52) U.S. Cl.
USPC .......................................................... 717/106

(58) Field of Classification Search ........... 717/104–119
See application file for complete search history.

(56) References Cited

U.S. PATENT DOCUMENTS

| | | | |
|---|---|---|---|
| 7,219,330 B2 | 5/2007 | Hogg et al. | |
| 7,367,015 B2 | 4/2008 | Evans et al. | |
| 7,747,836 B2 * | 6/2010 | Rajan et al. | 711/203 |
| 2005/0193369 A1 | 9/2005 | Brumme et al. | |
| 2008/0127056 A1 | 5/2008 | Java et al. | |

OTHER PUBLICATIONS

Alan Gordon, "Exploring the CLR", 2003, .NET and COM Interoperability Handbook, Prentice Hall, chapter three, pp. 89-204.*
David A. Graf, "Implementing a Purity and Side Effect Analysis for Java Programs", 2006, Software Component Technology Group, ETH Zurich, pp. 1-39.*
Mabbutt, Dan, "Retrieve, Change, or Create Program Information", Retrieved at <<http://visualbasic.about.com/od/usingvbnet/a/proginfo.htm>>, Jun. 16, 2007, pp. 2.
"VusCode—Coding Dreams since 1998!", Retrieved at <<http://blog.vuscode.com/malovicn/archive/2007/12/24/net-foundations-net-assembly-structure.aspx>>, Aug. 8, 2008, pp. 10.
"Portable Executable", Retrieved at <<http://en.wikipedia.org/wiki/Portable_Executable>>, Aug. 8, 2008, p. 4.

(Continued)

Primary Examiner — Ted T Vo

(57) ABSTRACT

An assembly aggregate comprising a virtual, logical view of an arbitrarily defined collection of intermediate code and metadata can be authored, factored, accessed, modified, and distributed. Multiple physical containers of assembly information can be aggregated to create a single logical assembly called an assembly aggregate. An assembly can thus be redefined as a logical view against (or projection over) the assembly aggregate. Such an assembly can be targeted to the requester: that is, an assembly can be redefined according to tool and/or execution context rather than conforming to explicit or implicit requirements enforced by the runtime.

20 Claims, 4 Drawing Sheets

OTHER PUBLICATIONS

"Metadata Attributes", Retrieved at <<http://cubit.sandia.gov/help-version10.1/geometry_creation/geometry_metadata/metatdata_attributes.htm#modifying>>, Aug. 8, 2008, pp. 3.

"Some Concepts of .Net Framework", Retrieved at <<http://devzone.spaces.live.com/blog/cns!F5EBC5A907B347B0>>, Aug. 8, 2008, p. 1.

Attardi,G. et al,CIL+Metadata>Executable Program, Journal of Object Technology, 2004, vol. 3 No. 2 p. 19-26.

Lindholm, T. Java(TM) Virtual Machine Specification, the 2nd edition, Prentice Hall, Apr. 29, 1999 pp. 93-172 Chapter 4 The class File Format.

Augusto J. et al, Common Language Runtime: a new virtual machine ICCC'04,2004, p. 23-31.

Rahman, J.M. et al, Making Frameworks more useable: using model introspection and metadata to develop model processing tools Elsevier Environmental Model & Software 2004 vol. 19 p. 275-282.

International Search Report and Written Opinion for International Application No. PCT/US2009/059122, mailed May 18, 2010, 11 pages.

IBM, "(JavaDoc EXT) Enhanced JRE to Provide Collaborative JavaDoc Examples", ip.com; Prior Art Database, Jan. 9, 2007, 4 pages.

Extended European Search Report for European Patent application No. 09819669.4, dated Jul. 4, 2012, 6 pages.

"Javadoc—The Java API Documentation Generator", retrieved from <http://java.sun.com/j2se/1A.2/docs/tooldocs/windows/javadoc.htn>, retrieved on Jan. 12, 2009, 40 pages.

\* cited by examiner

LOGICAL EXTENSIONS TO INTERMEDIATE CODE

BACKGROUND

Traditionally, software creation tools produce binary code. The binary code produced by the software creation tools typically includes everything an operating system needs to run the code, but little else. For example, binary code typically contains the code's machine instructions, information as to where to place the instructions in memory and so on. Additional information that describes characteristics of the binary code such as the names of the various functions in the code, the types of parameters expected by each function, the layout of the data types used by the code, and so on, is not present in typical binary code, although this information is present in the original source code. Hence, the conversion from source code to binary code is a lossy process. It produces a result that can be considered relatively opaque, meaning that it is difficult to reconstruct the lost information by looking at the binary code.

The additional information that describes characteristics of the binary code is sometimes called metadata: a generic term for data that describes other data, where in this case, the described data is the binary code. Without the metadata, it is difficult, sometimes impossible, for other software, such as development tools and compilers, to determine what the binary code contains, does, or is expected to do. For example, by examining the binary code, a tool typically cannot determine: what data types the code defines, what methods the types define, the contract that a particular method is attempting to satisfy, how software debugging tools are to display the data types, how software analysis tools are to analyze the data types and methods and so on.

In contrast, systems that compile code to an intermediate byte code representation typically place considerably more information into the resulting output than just the binary code. The container that contains the intermediate byte code representation is sometimes called an assembly or in Java, a Java class file or a JAR file (a Java Archive file, a zip file containing multiple class files). The term "assembly" as used herein refers to any such container of byte code and metadata.

In addition to the intermediate byte code, an assembly thus may include additional information, (metadata), which describes aspects of the binary code itself. An assembly as known today includes metadata describing the class, its fields, methods, etc., as well as custom attributes on the members of the class. It also contains information on dependencies of the assembly, links to types that may have been moved out of the assembly, etc. Metadata enables other software to retrieve information about the intermediate code. Therefore, an assembly is more transparent (meaning that information about the binary code is more discoverable) to tools examining the assembly than is a traditional binary code module.

The additional metadata and its resulting transparency, however, often is accompanied by undesirable costs. For example, the metadata intended for use by tools and code designers but not used during runtime may occupy memory during runtime. Running code may require the intermediate byte code implementations of a type but the intermediate byte code implementations of the type may not be needed at design time or by many non-runtime tools.

In known systems, all potential metadata has to be known when compiling the source code into intermediate byte code to create the assembly. Most of the code and metadata for an assembly typically resides in a single repository: the binary assembly itself, although additional metadata may also reside in a separate program database (PDB) repository. A software developer creates these code and metadata repositories for an assembly when the developer compiles source code into the desired assembly. As a result, only the original author of an assembly may be able to create or modify the assembly. Security features typically invalidate code that has been changed. The ability to author, organize, access and modify code and metadata may also be limited by constraints imposed to support the literal compilation and execution of intermediate byte code. These constraints can also impact characteristics such as performance, security, etc., in undesirable ways.

SUMMARY

An assembly aggregate comprising a virtual, logical view of an arbitrarily defined collection of intermediate code and metadata can be authored, factored, accessed, modified, and distributed, etc. in multiple ways. Multiple physical containers of assembly information can be aggregated to create a single logical assembly called an assembly aggregate. An assembly can be redefined as a logical view against (or projection over) the assembly aggregate. An assembly can be defined as a logical view against (or projection over) the aggregation of multiple physical containers of assembly information. An assembly can be targeted to the requester: that is, an assembly can be redefined according to tool and/or execution context rather than conforming to explicit or implicit requirements enforced by the runtime. Targeted, customized views can be consumed into the virtual assembly. Arbitrary views into the intermediate code and metadata associated with an assembly aggregate can be constructed, including extending or altering the format and descriptive capabilities of each. Components that contribute to an assembly aggregate can be extended, edited, and authored, post-compilation, and after an assembly has been distributed by a software enterprise, without invalidating the assembly. Extension assemblies can be authored using existing metadata/byte code formats enabling existing tools and application program interfaces (APIs) to use the extension assemblies.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
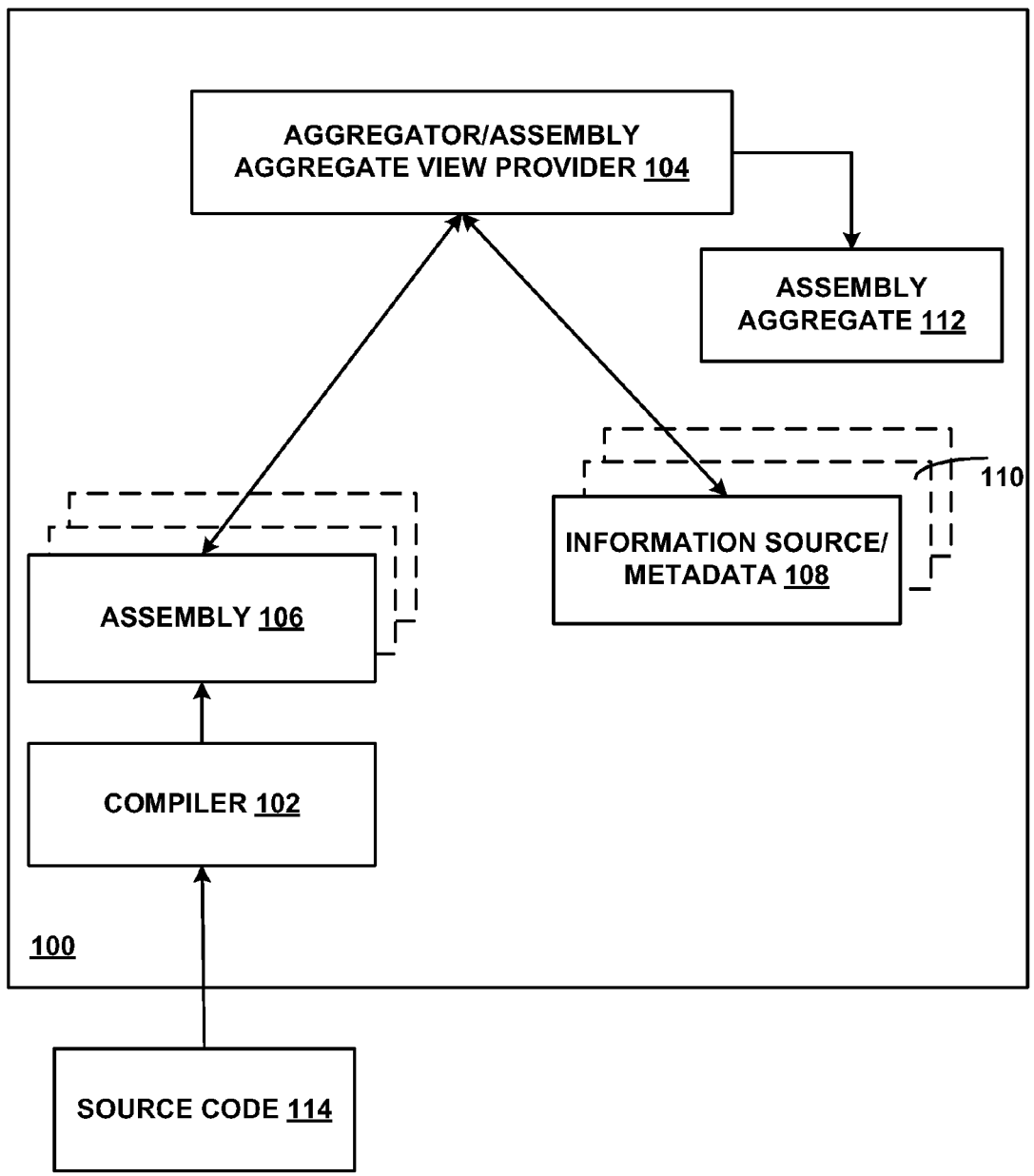
FIG. 1 is a block diagram of an example of a system in which logical extensions to intermediate code can be made in accordance with aspects of the subject matter disclosed herein.

Historically, binary code generated for execution in unmanaged runtime environments has not been distributed in a form that can be easily examined and understood post-compilation. This limitation is particularly obvious in the absence of debug symbols and when code has been subjected to significant optimizations during the compilation and code generation process. Even when compiled without optimizations, however, and in the presence of rich debug symbols, source code (in concert with dynamic execution and inspection via a debugger) is often much more understandable by human beings than is binary code. The ability of tools to analyze native code post-compilation is also limited. Hence, most native analysis tools either execute against source or are integrated with the compiler/linker, a period of time when the greatest global understanding of code and its corresponding metadata exists. In addition to the complications listed above, unmanaged runtimes typically do not provide the ability to annotate executable code with arbitrary metadata that can support an open-ended set of human- and tools-driven scenarios.

With the proliferation and popularity of managed runtime environments, however, this situation began to change. Examples of managed runtime environments include Sun Microsystem's JAVA and Microsoft's .NET. The Java compiler converts Java source code into Java byte code (an intermediate language for the Java Virtual Machine (JVM)). The Java Runtime Environment (JRE) converts intermediate byte code into native machine code on the fly. The Microsoft Common Language Runtime provided the original implementation driving the Common Language Infrastructure (CLI) standard. The CLI defines a specification for compiling source code into CIL (Common Intermediate Language, previously known as MSIL or Microsoft Intermediate Language) byte code and supports metadata in units referred to as managed assemblies. Managed assemblies as well as Java class files comprise a discoverable intermediate representation that can ultimately be compiled into machine code and executed. CIL itself, when decompiled into a direct representation of opcodes and operands, is a human-readable language. The additional metadata in a managed assembly provides supporting information (type and member details, security permissions, etc.) that is helpful to verify and transform the byte code into actual machine code is also readily available to an open-ended number of human- and tools-driven scenarios. Outside of normal loading and executing code, the mechanism for inspecting the intermediate byte code and metadata is called Reflection.

Metadata may be extensible. Metadata extensibility may come in the form of custom attributes, a mechanism for annotating all metadata objects with simple names and (optionally) data blobs consisting of certain system primitives (such as strings, integers, etc.). Metadata may also be extensible by use of custom modifiers to arbitrarily extend member signatures. These modifiers are available to assist in operations such as resolving, overloading, or binding to members. Metadata APIs for declaring, enumerating and retrieving custom attribute and member signature metadata are typically available so that any additional data associated with custom attributes are also recoverable by inspection APIs.

Ultimately, however, a user is likely to want to run (execute) the code in an assembly. Typically, a user wants the code to run as quickly as possible, using as few resources as possible. Including all the discoverable information, may, however, impose a significant runtime cost. For example, adding metadata to an assembly increases the assembly's physical size. Larger assemblies occupy greater disk space. Loading larger assemblies into memory requires more input output operations and takes more time because there is more data to read. Mapping the larger assemblies into memory requires more virtual address space, which leaves less available address space for other purposes. Larger assemblies also may negatively affect other performance characteristics such as working set and locality of reference. Furthermore, the operating system has to sift through all the information that is not literally relevant to execution to find the information that is relevant to execution.

Thus, although adding information to an assembly that is not relevant to its execution may provide benefits to the developer, (e.g., better information during software development, better code analysis, easier debugging, more meaningful performance statistics, and so on), doing so may reduce runtime performance. Additionally, there are several limitations to the utility of the known systems. Currently, for example, only assembly authors can extend metadata: metadata can only be extended in a compilation context, after modifying relevant source code and/or build mechanisms. Assembly identity is constrained to a specific build of a binary and is further constrained by any version information associated with it. Finally, not everything that is desirable to describe can be represented by runtime attributes.

To address these limitations and others, an entity referred to herein as an assembly aggregate is introduced. An assembly aggregate may refer to a composition of metadata and code (potentially byte code and native code) that describes a set of types. Some possible components of this aggregation include but are not limited to: one or more managed assemblies, XML files such as Intellisense files, JavaDoc files, and program database (PDB) files.

As defined today, a runtime assembly is a module that can be loaded in order to create instances of one of its types and/or to execute code in one or more of a type's members (or to execute code that exists at the assembly global scope). Some metadata (such as information regarding serialization, security permissions, visibility, and so on) resides in this assembly so that all available code can be executed. Additionally, the runtime assembly might or might not contain additional metadata (such as custom attribute definitions) that are not relevant when literally executing the assembly code. This type of metadata is hereafter referred to as "cold metadata".

In contrast, an assembly aggregate is, logically, a proper superset of the information contained in a runtime assembly. A runtime assembly in accordance with aspects of the subject matter disclosed herein, is defined as a view on, or a projection over, an assembly aggregate that is used by the runtime environment. The runtime assembly view may be targeted to the needs of the requester of the view. The runtime assembly view may include only the information from the aggregate needed to produce the current runtime assembly. Other views of the aggregate assembly may be used by different tools. For example, when resolving a reference at link-time, a compiler may need a view of the assembly aggregate that contains information about the public types and methods, and their custom attributes but does not need to inspect method bodies in the referenced code. The view of the aggregate assembly provided to the compiler may thus include information about the public types and methods and their custom attributes but may exclude method bodies in the referenced code.

An assembly aggregate may be created by combining multiple existing metadata and code repositories (binary runtime assembly files, text files such as XML IntelliSense files, binary PDB data files, and others). In accordance with this aspect of the subject matter disclosed herein, a change to an underlying component of the assembly aggregate may change the aggregate assembly. A repository may be defined, the repository comprising the assembly aggregate and may be loaded with specified metadata and code. An application that requires information about that metadata or code may request a view on that metadata and code from the assembly aggregator or assembly aggregate view provider and in response may receive from the assembly aggregate view provider a view targeted to the requester.

An assembly aggregate may be created to provide legacy components on demand. For example, the managed code runtime environment may request that the assembly aggregator/assembly aggregate view provider produce a particular version of a specified runtime assembly. The assembly aggregator/assembly aggregate view provider may then create the requested runtime assembly. In response to a request for a particular design-time view of the assembly aggregate, a customized design-time managed assembly may be returned. Similarly, a request for a native code image of a runtime assembly from the assembly aggregate may result in the production of an NGEN-ed image. The native image generator (NGEN) for the Microsoft Common Language Runtime produces a native binary image for a particular environment. The byte code is completely converted into native CPU instructions before runtime, eliminating the JIT compilation process overhead. When NGEN is run against an assembly, the resulting native image may be placed into a Native Image Cache for use by other managed assemblies.

In accordance with other aspects of the subject matter disclosed herein, an assembly aggregator/assembly aggregate view provider may be asked to generate an aggregate assembly. A binary rewriter may produce both the runtime assembly and a separate storage mechanism for cold metadata. A parallel source form for an assembly describing characteristics of an API with which it is associated and including additional metadata, but excluding implementation details, may be stored. The source form may be compiled into a binary form for ease of integration with tools, or distributed publicly in source form to provide human-readable comments. This second storage format may provide a public, durable representation of the contract provided by the runtime assembly.

It will be appreciated that the assembly aggregate may act as an opaque repository of code and metadata to the rest of the system and can be stored in any desired format. The compact metadata binary as known today in a managed assembly can be split into multiple pieces and stored in one or more files on stable storage. Similarly, the byte code associated with the managed assembly can be split into one or more physical assemblies. All other managed metadata, including security permissions, member signatures, resources, marshaling details, scoped statistics and other entities can also be distributed across multiple files. This information can potentially be duplicated or can differ across files, according to the purpose of the metadata. Although in most cases, at least one base or standard managed assembly may exist that is intended to be compiled and executed by the runtime, an assembly aggregate may include more than one runtime assembly binary.

An assembly aggregate therefore comprises a virtual scheme for organizing managed information in flexible ways. For example, a single assembly aggregate may organize information for every version of a type that has ever been distributed. An assembly aggregate may organize the actual, physical type information for the same version of a type as it has shipped in multiple implementations. A single assembly aggregate may be created that holds metadata for every entity in a logical group (such as, for example, the group comprising "all standard Microsoft CLR v1.1 redistributables") and so on.

An assembly aggregate thus may be used to provide flexible granularity. Code and metadata that is germane to a specific tool or execution context can be packaged in discrete module(s), such that deployment and access of this data is more efficient, secure, performant, etc., than when aggregated within a single runtime assembly as known today. Similarly, byte code and metadata that is not germane to a tool or runtime scenario can be physically separated into a separate store. An assembly may be used to provide virtualizable views. An assembly aggregate can be accessed as a single logical entity or any constituent assembly (or combination of assemblies) can be grouped together to provide a view of the assembly's byte code and metadata. An assembly may be used to provide a flexible identity. An assembly aggregate's identity may be flexible in that it may not conform to the standard notion of assembly identity as defined by the CLI or JAVA runtime and as generally understood and used today. An assembly aggregate, for example, may present a single view of every version of a type that has ever been distributed to customers.

An assembly aggregate may be used to provide flexible content. The view into assembly aggregate content may be flexible, in that relevant byte code and metadata could be derived by aggregating, combining, transforming, etc., data provided by one or more constituent extensions. Such a view may represent a runtime assembly that is ultimately compiled and executed. An assembly aggregate may be used to provide flexible access. The deployment, discoverability, access, and other operations performed on an assembly aggregate may be unconstrained by currently existing requirements. An assembly aggregate may be used to provide flexible authoring. An assembly aggregate can be extended by arbitrary authors, at arbitrary times, by tooling, and by processes beyond compilation of the definitive source backing a runtime assembly.

Logical Extensions to Intermediate Code

FIG. 1 illustrates an example of a system 100 that provides logical extensions to intermediate code. System 100 may include one or more of the following: a compiler 102, an assembly aggregator/assembly aggregate view provider 104, one or more physical assemblies 106, and one or more information sources 108, 110, etc. All or portions of system 100 may reside on one or more computers such as the computers described below with respect to FIG. 3. The system 100 or portions thereof may comprise a portion of an integrated design environment 600 (IDE) such as the ones described and illustrated below with respect to FIG. 4, residing on one or more computers such as the computers described with respect to FIG. 3 also described below. Alternatively, system 100 or portions thereof may be provided as a stand-alone system or as a plug-in.

A compiler 102 may comprise a .NET compiler that compiles source code written in a .NET language to intermediate byte code. .NET languages include but are not limited to C#, C++, F#, J#, JScript.NET, Managed Jscript, IronPython, IronRuby, VBx, VB.NET, Windows PowerShell, A#, Boo, Cobra, Chrome (Object Pascal for .NET, not the Google browser), Component Pascal, IKVM.NET, IronLisp, L#, Lexico, Mondrian, Nemerle, P#, Phalanger, Phrogram, PowerBuilder, #Smalltalk, AVR.NET, Active Oberon, APLNext, Common Larceny, Delphi.NET, Delta Forth .NET, DotLisp, EiffelEnvision, Fortran .NET, Gardens Point Modula-2/CLR, Haskell for .NET, Haskell.net, Hugs for .NET, IronScheme, LOLCode.NET, Mercury on .NET, Net Express, NetCOBOL, OxygenScheme, S#, sml.net, Wildcat Cobol, X# or any other .NET language. Compiler 102 may comprise a JAVA compiler that compiles source code written in JAVA to byte code.

Compiler 102 may compile source code 114 into one or more physical managed assemblies 106, etc. A physical managed assembly may include byte code and the original metadata necessary to define types and execute code, as well as some custom attributes. An aggregator portion of assembly aggregator/assembly aggregate view provider 104 may aggregate one or more physical assemblies 106, etc., and extension metadata from other information sources 108, 110, etc. into an assembly aggregate 112. An assembly aggregate 112 may be created by combining multiple existing metadata and code repositories (binary runtime assembly files, text files such as XML IntelliSense files, binary program database (PDB) data files, bug fix files, email files, rules files and/or other information sources). An application (not shown) that wants information about that metadata or code may request a particular assembly aggregate comprising a logical view of the metadata and code from the assembly aggregator or assembly aggregator view provider 104. In response the assembly aggregator or assembly aggregator view provider 104 may return a pre-computed assembly aggregate 112 or may create the requested logical view and return the created assembly aggregate 112. Rules may be provided determining information that may be filtered out of a view of an assembly aggregate. Providing views of assembly aggregates may map one assembly to multiple physical assemblies, and/or may map many assemblies to one view. By using existing metadata file formats, existing compilers and tools can read views of assembly aggregates and thus can work with the views without being modified.

An assembly aggregate 112 may comprise a build-time reference assembly comprising a filtered view of assembly aggregate metadata. For example, a rule from a rule file or encoded within a separate tool may specify that "all methods that have a particular custom attribute are to be filtered out". Reference assemblies may define surface area (meaning a subset of the assembly aggregate's types and members, for a compiler, an IDE, and static analysis tools), and provide an opportunity for additional annotations that may be useful at compile time or static analysis time. The logical view of metadata provided by a build-time reference assembly may be limited to a subset of metadata that is needed to compile code that depends on the metadata. A build-time reference assembly is an example of how an assembly aggregate can provide flexible granularity and access. For example, a build-time reference assembly may comprise metadata for publicly visible items but exclude private items. Method bodies of a build-time reference assembly may be empty, because intermediate language method bodies are not relevant to a build operation. A build-time reference assembly therefore may be a lightweight entity that does not expose intermediate code and metadata beyond that needed for a specific tools-driven context. A build-time reference assembly may be placed in any (arbitrary) location or locations, including in directories for which administrative privileges are not needed for access. Build-time reference assembly aggregates may be generated as a post-build step using the aggregate assembly as input, or may be generated from a standalone artifact written in a source language.

An assembly aggregate can be extended at any time, inside or outside of the canonical build environment, and can be extended by an indeterminate set of authors including the software provider and software users (e.g., customers of the software provider). Changes to an assembly aggregate may be reflected in a build-time reference assembly produced from the aggregate on the next request.

In accordance with some aspects of the subject matter disclosed herein, a cross-version or cross-platform reference assembly may aggregate constructs that are logically equivalent but that differ by released version or by target platform. Customized views can be retrieved from the assembly aggregate. In a standard runtime assembly, it is not possible to describe two different versions of the same type. An assembly aggregate, on the other hand, can combine all or a subset of the intermediate code and metadata that has contributed to a type definition. From this assembly aggregate, tools can retrieve various views that the tools put to a variety of purposes, such as identifying breaking changes across versions.

In accordance with some aspects of the subject matter disclosed herein, data unnecessary for execution can be separated, to improve runtime JIT compilation process overhead or on-the-fly compilation overhead and to lower working set (thus improving performance), and to enable rich tool scenarios without impacting execution. Examples include design-time, compile-time, and analysis-time specific attributes.

In debugging operations and code analysis reference assembly views that include decoupled intermediate language can be aggregated with the definitive intermediate language in order to augment static and/or runtime analysis and runtime execution. Trace statements or intermediate language that validates pre- and post-conditions for methods (as well as object invariants) can be stored in discrete assemblies as byte code. The assembly aggregate can provide an aggregated view of this data suitable for consumption by tools or by the JIT or on-the-fly compiler itself.

Because a reference assembly allows a separation between the runtime assembly and the compile-time view of the available types, the reference assembly can be used to check some runtime policy decisions at compile time. Consider a security model (such as the CLR and Silverlight's transparency model) where methods are split into "safe", "critical", and "safe-critical" buckets, where an untrusted application can only call the "safe" or "safe-critical" methods. In this view, runtime enforcement has to ensure that the application does not call any "critical" methods. The development experience can be enhanced by giving the user a reference assembly view of the aggregate that only contains only the "safe" and "safe-critical" methods. Any attempt at accessing a "critical" method would result in a compile-time error instead of a runtime error (due to a failed security check). While this does not alleviate the runtime from continuing to enforce its security model, it does significantly help the developer by ensuring that a high degree of code coverage does not need to be included to ensure compliance with the security model. The same type of filtering can be applied to other security models, such as Code Access Security, to produce reference assemblies for both fully-trusted and partially-trusted consumers.

A reference assembly view may allow friend assemblies to be implemented in a more disciplined manner. Friendship, first introduced at a class level in C++, has been extended in the CLI to include methods in an assembly marked "internal". Currently, an implementation of friend assemblies typically allows all internal methods in the first assembly to be visible to all types in the second assembly. The surface area between friend assemblies is not tightly controlled. Because there are few restrictions of access to internal members, a developer may be less likely to pay strict attention to the contract of an internal method, or perhaps even decide to remove internal methods. If it were explicitly known that a particular method was used by a friend assembly, it would be known that the method has additional versioning and compatibility requirements than does a typical internal method. One way to do this would be to extend the runtime's notion of friend assemblies with a "FriendAccessAllowed" attribute, and only include internal methods marked with this attribute in the reference assembly (instead of known implementations in which all internal methods are included in the assembly). Instead, in accordance with aspects of the subject matter disclosed herein, the smaller internal surface area exposed in the reference assembly may prevent access to internal methods unless the internal methods are explicitly marked. Multiple reference assemblies may be used to expose subsets of a library, for supplemental compile-time enforcement of security for friend assemblies. Multiple reference assemblies may also be used for programming model restrictions.

Figure 2:
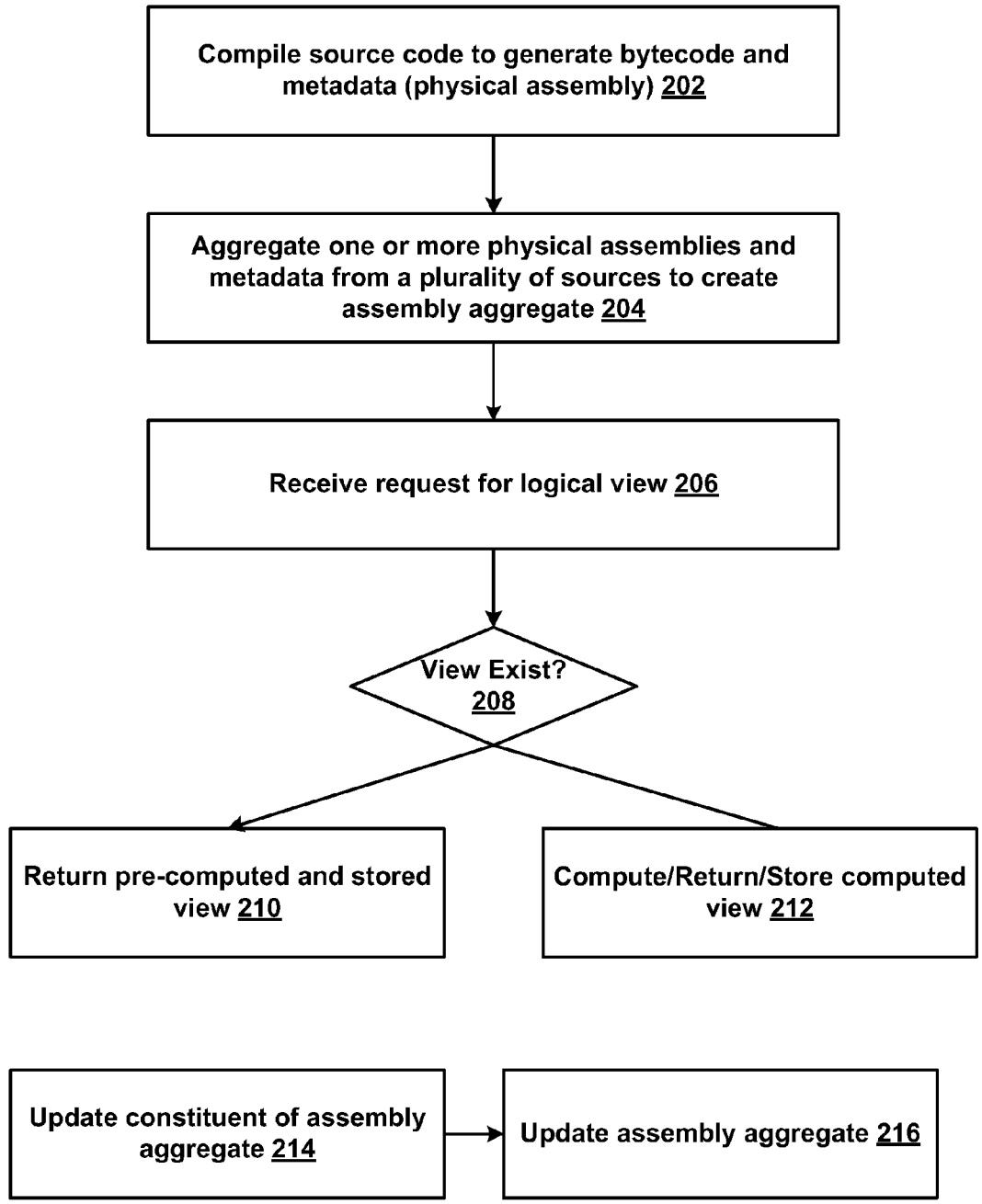
FIG. 2 is an example of a method for extending intermediate code in accordance with aspects of the subject matter disclosed herein.

FIG. 2 illustrates an example of a method for providing intermediate code extensions in accordance with aspects of the subject matter disclosed herein. At 202 source code may be compiled by a compiler such as the ones described above with respect to FIG. 1. The output of the compiler is a physical assembly in intermediate code. Metadata may be associated with the byte code produced. At 204 an assembly aggregator/assembly aggregate view provider such as the ones described above with respect to FIG. 1, may aggregate one or more physical assemblies and metadata (from one or more sources, as described above) into an assembly aggregate. At 206, the assembly aggregator/assembly aggregator view provider may receive a request for a particular view from an application or other entity. At 208 the assembly aggregator/assembly aggregator view provider may determine if the requested view has been pre-computed. At 210, if the assembly aggregator/assembly aggregator view provider determines that the requested view has been pre-computed and stored, the assembly aggregator/assembly aggregator view provider may return the requested view to the requester. If at 208, the assembly aggregator/assembly aggregator view provider determines that the requested view is not available, at 212 the assembly aggregator/assembly aggregator view provider may compute the view and return the requested view to the requester.

At 214 a constituent component of the assembly aggregate may be changed, changing the assembly aggregate 216. Subsequent requests for views of the changed assembly aggregate may return updated views. It will be appreciated that changing one or more constituent components of the assembly aggregate may occur at any time, as described more fully above and views may be re-computed and stored. For example, additional metadata may be added to the assembly aggregate before a request for a logical view is received. It will also be appreciated that changes to the physical assemblies will change the assembly aggregate. Changes to the underlying data sources may be propagated automatically. For example, the assembly aggregate may be implemented as a table of pointers where each pointer points to a data source, each data source comprising one or more managed physical assemblies or one or more sources of metadata.

Example of a Suitable Computing Environment

Figure 3:
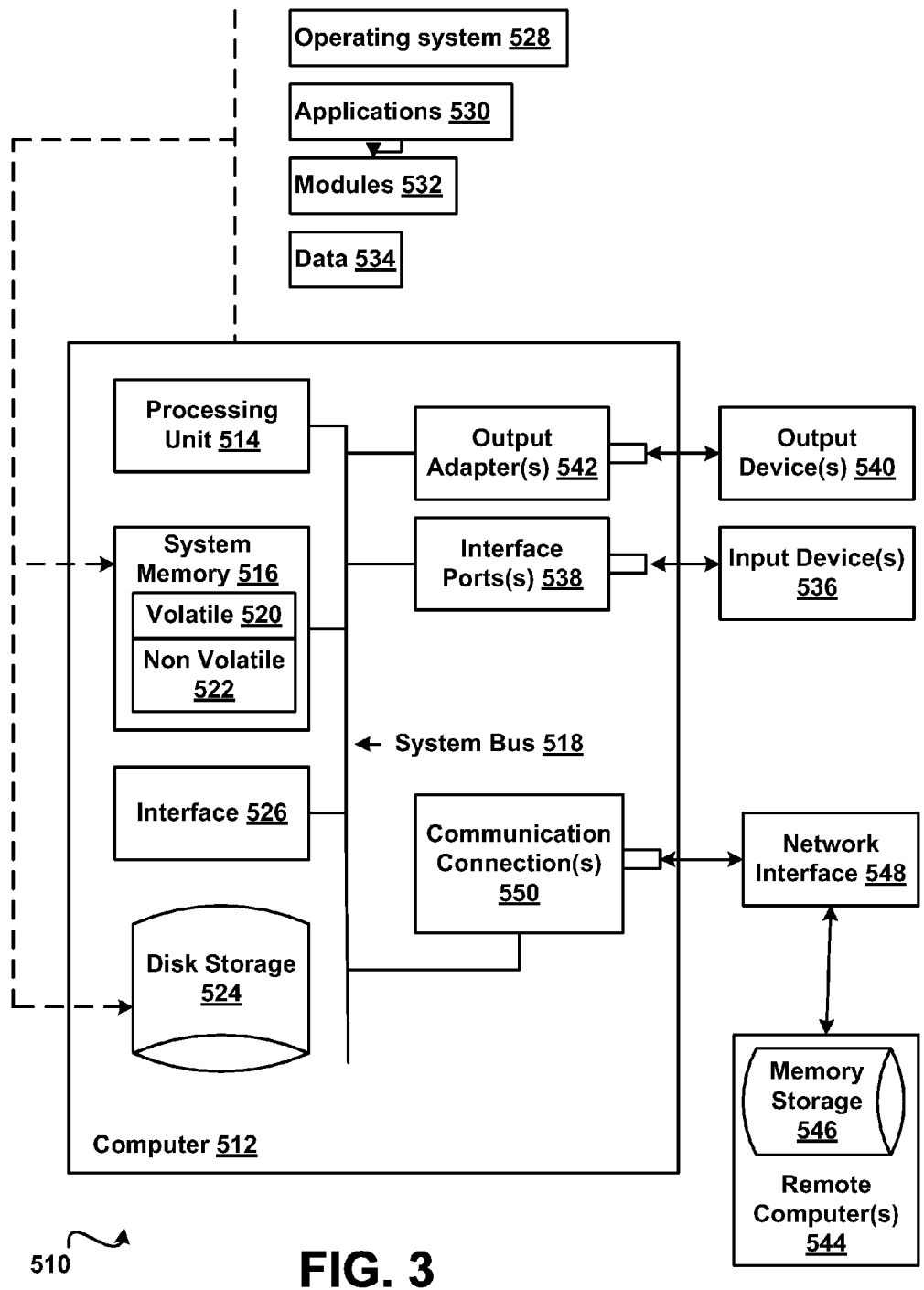
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combination s of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
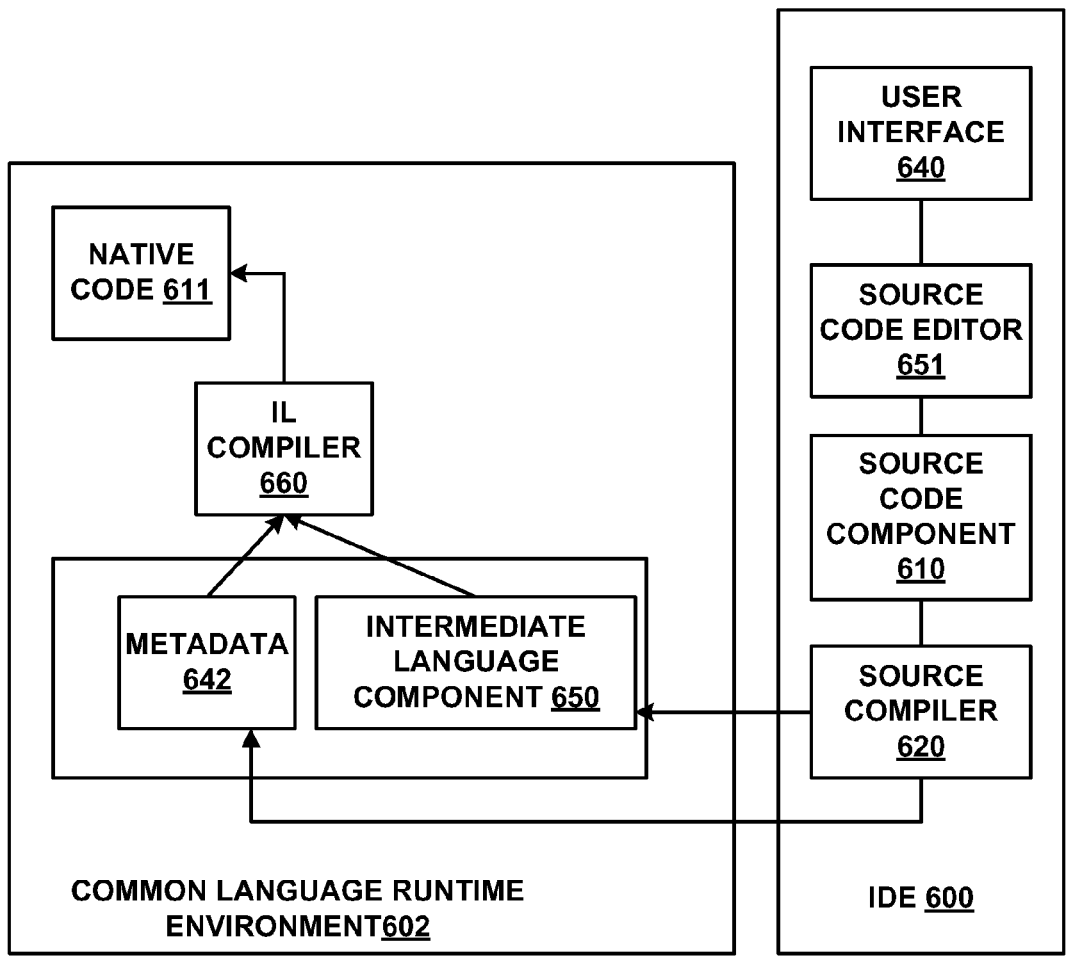
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler, or in simpler embodiments, an interpreter), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system that provides logical extensions to intermediate code comprising:
   one or more processors; and
   an assembly aggregator, implemented using at least one of the one or more processors, that:
   aggregates a plurality of physical assemblies generated by a compiler, each of the plurality of physical assemblies comprising original metadata associated with the respective physical assembly, with extension metadata from at least one first repository of a plurality of repositories to create an assembly aggregate, the plurality of physical assemblies residing in at least one second repository of the plurality of repositories that is different from the at least one first repository, the assembly aggregate being modifiable by providers of the assembly aggregate and consumers of the assembly aggregate, and the assembly aggregate comprising a plurality of views of the plurality of physical assemblies and the extension metadata from the at least one first repository;
   receives a first request for a first view of the plurality of views from a requestor and returns the first view targeted to the requester; and
   receives a second request for a second view of the plurality of views from the requestor and returns the second view targeted to the requester, the second view being different from the first view.

2. The system of claim 1, wherein the assembly aggregator pre-computes and stores at least one of the first view or the second view targeted to the requestor in a data store.

3. The system of claim 1, wherein the assembly aggregator computes the first view of the assembly aggregate in response to the first request and returns the computed view to the requester.

4. The system of claim 1, wherein a component of the assembly aggregate is extended, edited or authored, post-compilation, without invalidating the assembly aggregate.

5. The system of claim 1, wherein the at least one first repository comprises rules for filtering information from a view of the assembly aggregate, an XML file, a text file, a program database file, an email file, a bug fix file or a binary runtime assembly file.

6. The system of claim 1, wherein in response to a change to a component of the assembly aggregate, the assembly aggregate is changed.

7. The system of claim 1, wherein at least one of the first view or the second view of the assembly aggregate comprise a legacy component, a native binary image for a particular environment, an NGENed image, a build-time reference assembly comprising a subset of metadata limited to metadata needed to compile source code into intermediate byte code, or a runtime reference assembly comprising a subset of metadata limited to metadata needed to execute the reference assembly.

8. A method of extending intermediate code comprising:
generating a plurality of physical assemblies by a compiler, each of the plurality of physical assemblies comprising original metadata associated with the respective physical assembly and being stored in at least one first repository of a plurality of repositories;
aggregating, by at least one processor, the plurality of physical assemblies from the at least one first repository and extension metadata from at least one second repository of the plurality of repositories that is different from the at least one first repository into an assembly aggregate comprising a plurality of views of the plurality of physical assemblies from the at least one first repository and the extension metadata from the at least one second repository, the assembly aggregate being modifiable by providers of the assembly aggregate and consumers of the assembly aggregate;
storing the assembly aggregate in a data store;
receiving a first request for a first view of the plurality of views from a requestor; and
receiving a second request for a second view of the plurality of views from the requestor, the second view being different from the first view.

9. The method of claim 8, further comprising:
returning the requested first view to the requester.

10. The method of claim 8, further comprising:
pre-computing the first view of the plurality of views and storing the pre-computed first view.

11. The method of claim 8, computing the first view of the assembly aggregate in response to the first request.

12. A computer-readable memory comprising computer-executable instructions which when executed cause a computing environment to:
aggregate a plurality of physical assemblies generated by a compiler and that reside in at least one first repository of a plurality of repositories, each of the plurality of physical assemblies comprising original metadata associated with the respective physical assembly, and extension metadata from at least one second repository of the plurality of repositories that is different from the at least one first repository into an assembly aggregate comprising a plurality of views of the plurality of physical assemblies from the at least one first repository and the extension metadata from the at least one second repository, the assembly aggregate being modifiable by providers of the assembly aggregate being modifiable by providers of the assembly aggregate and consumers of the assembly aggregate;
provide a first view of the plurality of views of the assembly aggregate to a requester, the first view provided to the requester targeted to the requester; and
provide a second view of the plurality of views of the assembly aggregate to a requester, the second view provided to the requester targeted to the requester, and the second view being different from the first view.

13. The computer-readable memory of claim 12, comprising further computer-executable instructions, which when executed cause the computing environment to:
receive a request for the first view from the requester.

14. The computer-readable memory of claim 13, comprising further computer-executable instructions, which when executed cause the computing environment to:
return the first view of the assembly aggregate to the requester.

15. The computer-readable memory of claim 13, comprising further computer-executable instructions, which when executed cause the computing environment to:
compute the first view of the assembly aggregate in response to receiving the request from the requester.

16. The computer-readable memory of claim 13, comprising further computer-executable instructions, which when executed cause the computing environment to:
pre-compute and store the first view, the first view targeted to the requestor and return the stored view to the requester.

17. The computer-readable memory of claim 12, comprising further computer-executable instructions, which when executed cause the computing environment to:
extend, edit or author a change to a component of the assembly aggregate, the component comprising the at least one second repository or a physical assembly of the plurality of physical assemblies, post-compilation, without invalidating a resulting assembly.

18. The computer-readable memory of claim 17, comprising further computer-executable instructions, which when executed cause the computing environment to:
provide a legacy component, a native binary image for a particular environment, an NGENed image, a build-time reference assembly comprising a subset of metadata limited to metadata needed to compile source code into intermediate code, or a runtime reference assembly comprising a subset of metadata limited to metadata needed to execute the reference assembly.

19. The computer-readable memory of claim 16, comprising further computer-executable instructions, which when executed cause the computing environment to:
update the assembly aggregate in response to a change to a component of the assembly aggregate.

20. The computer-readable memory of claim 12, comprising further computer-executable instructions, which when executed cause the computing environment to:
add an XML file, a text file, program database files, an email file, a bug fix file or a binary runtime assembly file to the at least one second repository or filter out metadata associated with the assembly aggregate according to at least one rule.

* * * * *